United States Patent Office 3,389,435
Patented June 25, 1968

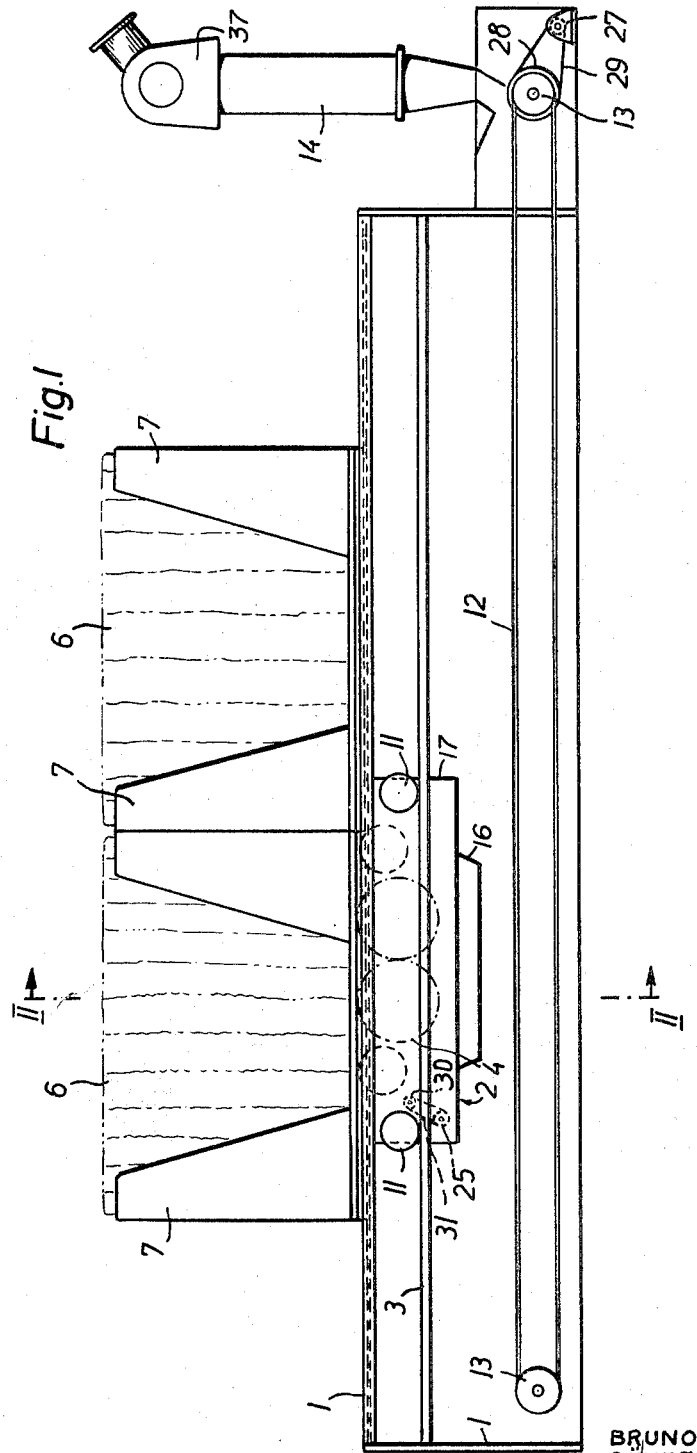

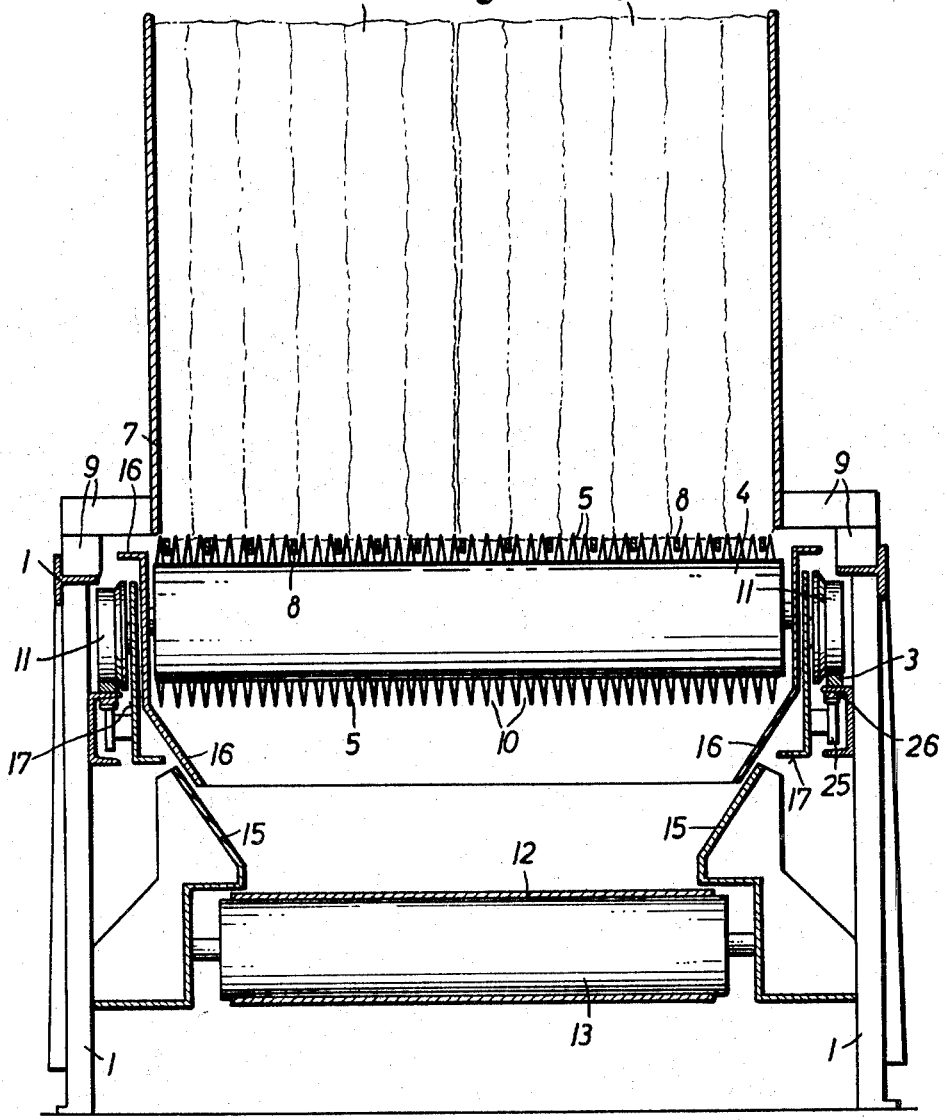

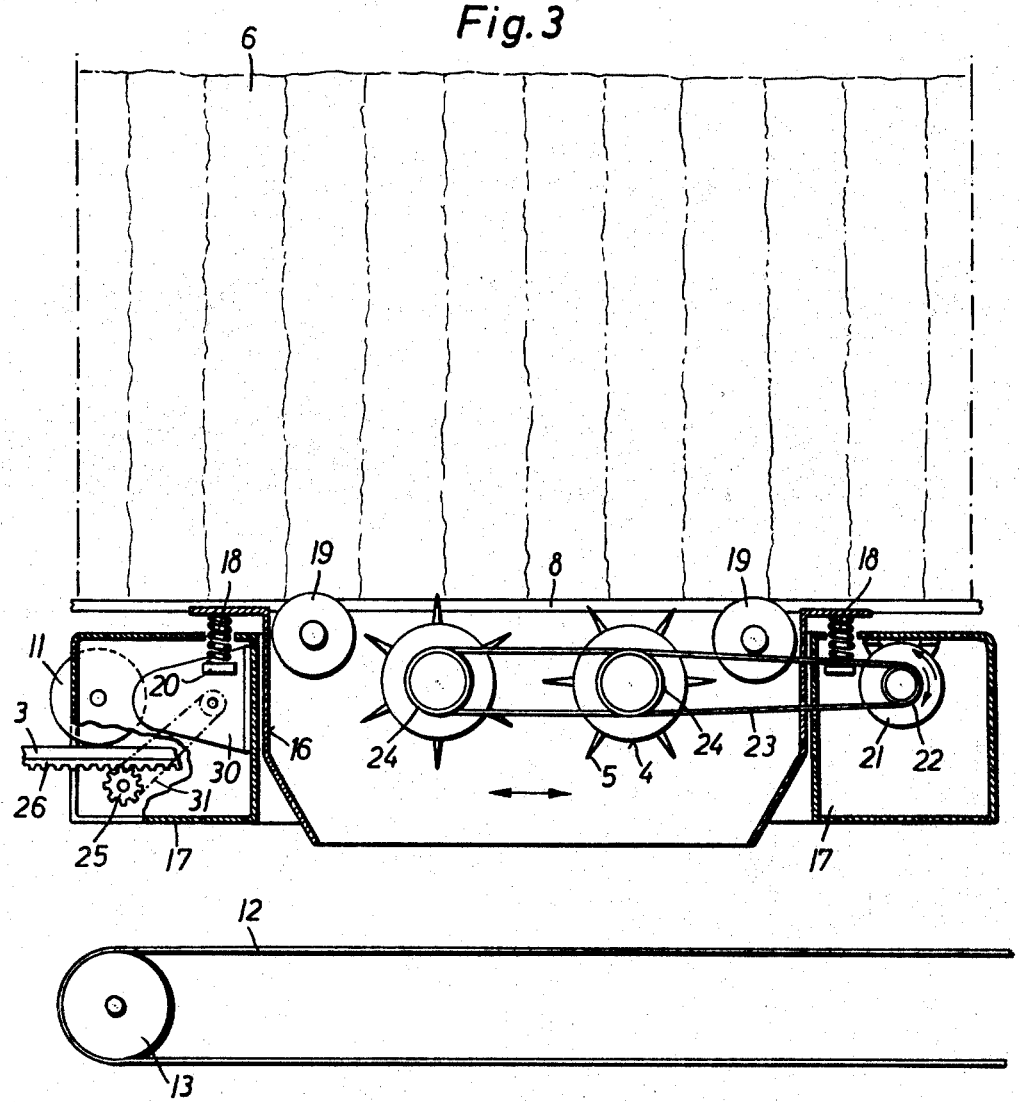

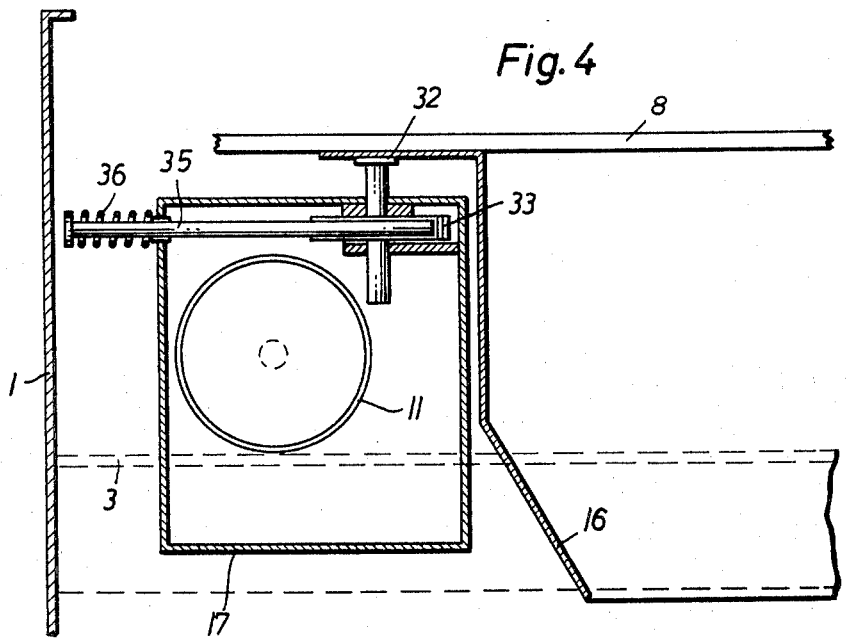
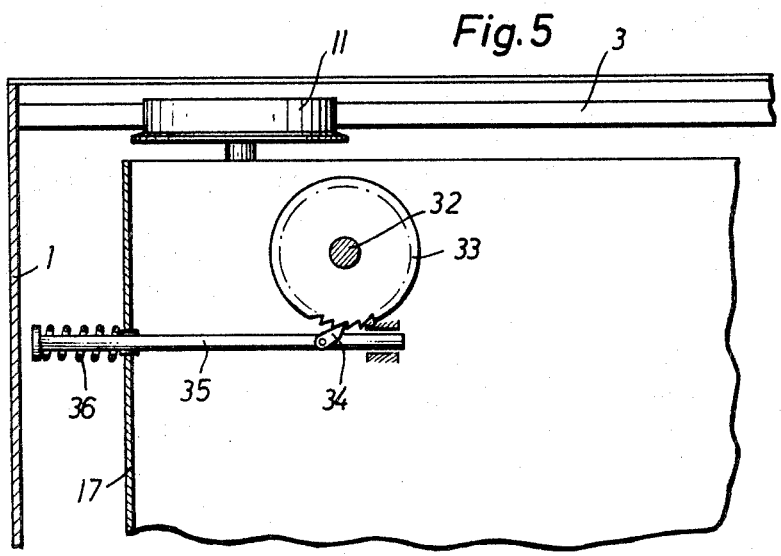

3,389,435
APPARATUS FOR OPENING BALES OF FIBRES AND IN PARTICULAR FOR OPENING COMPRESSED AND UNTREATED BALES OF FIBRES
Bruno Schwab, Dulmen, and Günter Eckrodt, Coesfeld, Germany, assignors to Hergeth K.G., Maschinenfabrik und Apparatebau, Dulmen, Westphalia, Germany, a corporation of Germany
Filed Sept. 15, 1964, Ser. No. 396,547
Claims priority, application Germany, Sept. 21, 1963, H 50,329
8 Claims. (Cl. 19—80)

This invention relates in general to a method and an apparatus for opening bales of fibres, in particular bales of compressed and untreated fibres and for mixing the opened fibre material, e.g. cotton, rayon and synthetic fibres.

Apparatus for mechanically opening bales of fibre material are already known in the art. However, these known apparatuses have some important drawbacks. For instance, in one type of such apparatus, the bales of fibre material are fed in a vertical or substantially vertical direction or in a horizontal direction to a teasing device for constantly extracting the fibrous material from the bale. In this type of device each bale has associated therewith one teasing device. Therefore, this type of device requires, when a mixture of fibres from several bales are to be teased, as many teasing or the like devices as there are bales which are to be opened. Consequently, this type of device not only is very space consuming, but is also costly and uneconomical to operate. In other known arrangements the fibre bales are moved to and fro above the teasing device or are successively displaced in a longitudinal direction over a plurality of teasing devices along a comparatively long path. This arrangement requires a considerable power input due to the heavy load requirement for reciprocally moving a row of bales. It should also be noted that in the last described arrangement the bales frequently tip over, which is another significant drawback of this known apparatus.

In view of the aforedescribed disadvantages in the known apparatus for mechanically opening, teasing, cutting, etc. bales of fibres, it is a general object of this invention to provide an apparatus of the aforedescribed character of simpler construction which operates in a more effective manner.

A further more specific object of this invention is to carry out the opening operation of the fibre bales as far as possible by mechanical means.

Yet another object of this invention is to provide an apparatus that successively removes layers of fibres from a series of juxtaposed bales in the form of flock and deposits the fibres on a conveyor belt, by means of which the fibres are carried to the next process step.

With these and other objects in view the apparatus of this invention comprises an arrangement in which the heavy bales of fibre material are substantially stationary during the opening and fibre removing operation. The fibre removing means are mounted on a carriage which moves to and fro along and underneath the row of bales and detaches a predetermined amount of fibre material from each bale. Due to the to and fro movement along and underneath a plurality of bales, an intimate mixture of the flocks and/or flakes of fibre material from the various bales is obtained. In this manner, by means of a single fibre removing means intimate fibre mixing and teasing results of two or more bales of fibre material can be obtained. This novel arrangement not only renders excellent fibre mixing results automatically, but is also of simple design, therefore costs relatively little and requires less power to operate than the known devices.

The stationary support for the bales is designed to accommodate anywhere from two to a substantially larger number of bales of fibre material. The fibre removing means are mounted on a carriage which is movable to and fro on a horizontal plane on a pair of rails secured to the stationary support. The fibre removing means comprise at least one rotatably mounted roller which has a plurality of pins and needles projecting from its cylindrical surface. The aforementioned pins or needles engage from beneath through a grating the fibre material on the bottom of the bales. The grating is supported on the stationary support. This novel arrangement makes it possible to dispense with the customary device for feeding the bales towards the fibre removing means. The bales due to their weight, which is mainly supported by the grating, bear firmly against the pins or needles and are consequently always correctly distanced therefrom.

The bales are advantageously stored on a plurality of adjustable hampers which are mounted on top of the stationary support. These hampers have as their bottoms the aforementioned grid or grating and have their sidewalls adjustably mounted on the machine frame. The spacing between the longitudinal bars of the grating coincides with the spacing between the rows of pins and needles of the roller so that the pins or needles can freely extend between the longitudinal bars of the grating and can thereby engage the bottom layer of the bales of fibre material that rest on the grating.

The use of adjustable and removable hampers renders significant advantages. For instance, the hampers can be easily removed and loaded elsewhere than on the machine proper. Each hamper preferably should accommodate two or more bales of fibre material. The bales are securely placed into the hampers, which are made sufficiently large to permit the necessary expanding and loosening of the bottoms of the bales of fibre material. This expansion and loosening of the fibres results in a more gentle teasing of the fibres from the bottom of the bale. The hampers can easily be removed from their stationary support by means of suitable lifting means after they have been emptied and can then be replaced by a new mixture of bales stored in a preloaded set of hampers, or in the alternative, the hampers can be reloaded after having been removed.

The aforementioned rollers with pins or needles are preferably mounted on a movable frame as will be described in detail below. This frame is vertically adjustable which can be effectuated in several different ways. The amount of fibres that are engaged and entrained by the pins or needles of the rollers, depends on the pressure exerted by the bales against the pins or needles, which in turn depends on the weight of the bales. The vertical adjustment feature of the frame is therefore important because it makes it possible to compensate for the loss of weight of the bales as the fibre removing operation progresses.

This automatic needle penetration adjustment can be effected in this type of device by means of a set of compression springs which support the carriage on which the needle rollers are mounted. The carriage is provided for this purpose with projecting feeler members, e.g. rollers, which abut against the bottom of the bales. These feeler members project slightly through the grating and are more or less depressed by bales according to their weight and consistency. Since the feeler members are mounted to the needle roller supporting carriage, the latter, due to its compression spring supports, is thereby automatically vertically adjusted. Due to the vertical adjustment of the carriage the penetration depth of the needles or pins varies according to the consistency and weight of the bales of fibre material. The aforedescribed automatic adjustment results in a practically constant rate of fibre removing over the entire bale height.

Other needle penetration adjusting means can be also provided. For instance, a threaded spindle and ratchet wheel arrangement can be operatively connected to the needle roller supporting carriage so that by means of the forward and rearward movement of the carriage, the latter is automatically adjusted in the vertical direction by the spindle and ratchet wheel arrangement. Another needle penetration adjusting means comprises a needle roller frame which is mounted on an inclined track in the carriage. In this manner the penetration depth of the teasing needle roller is continually adjusted. Yet another needle penetration adjusting means comprises feeler members or photoelectric cell means which are operatively connected to the carriage.

It is also within the scope of this invention to provide an apparatus with more than one needle roller mounted in the carriage. The drive means for the needle rollers are mounted in the carriage and are independent from the drive means for the carriage proper. The direction of movement of the carriage and the direction of rotation of the needle rollers are advantageously reversed with each forward and rearward movement by means of a set of limit switches which are mounted at the end positions of the carriage.

The driving motor for the carriage is preferably mounted on the latter. The drive shaft of this motor is provided with a gear or sprocket wheel that engages a gear rail secured to the stationary frame of the apparatus.

The novel features which are considered characteristic for the invention are set forth in particular in the appended claims. The invention itself, however, both as to its construction and its method of operation, together with additional objects and advantages thereof, will be best understood from the following description when read in connection with the accompanying drawings in which:

FIG. 1 is a diagrammatic front elevation showing the entire apparatus for opening and teasing bales of fibre material;

FIG. 2 is a cross-sectional view along line II—II of FIG. 1 showing the apparatus in a larger scale;

FIG. 3 is a sectional view of the carriage and needle rollers in which one preferred form of needle penetration adjusting means are illustrated.

FIGS. 4 and 5 show an alternative form of the needle penetration adjusting means.

Referring now to the drawings there is illustrated in FIG. 1, a supporting frame 1 on which is mounted a movable carriage 2 (comprising carriage 17 and frame 16 as described below and illustrated in detail in FIG. 2) which is adapted to move to and fro on rails 3 which are fixedly secured to the frame 1. One or more rollers 4 (two are illustrated in FIG. 1) are rotatably mounted in the carriage 2. These rollers have a plurality of pins or needles 5 on their cylindrical peripheries which radially project therefrom. The aforesaid needles or pins are adapted to engage from below the bales of fibre material 6 which rest on a grating support. The latter is formed as one or more baskets or hampers 7 in which the bales are held in position. The bottom of the hampers 7 are formed as gratings, which have only a plurality of longitudinal parallel bars 8 that extend parallel to the longitudinal axis of the device. The hampers 7 are provided with laterally extending brackets 9 which are supported by the frame 1 of the apparatus. The pins or needles 5 are arranged in circumferential rows on the peripheries of the rollers 4. Each row of pins 5 is separated from the next contiguous row by a space 10 which is sufficiently large to accommodate one bar 8 projecting therebetween. It is preferable that each hamper 7 accommodates two bales 6 as is illustrated in the drawings. The carriage 2 has at each end a pair of wheels 11 rotatably mounted thereon which roll over the rails 3 and thereby transport the carriage 2 back and forth along the pair of rails 3. A conveyor device is arranged underneath the hampers 7 and the rails 3. This conveyor device comprises an endless belt 12 which is driven around a pair of pulleys 13 oppositely rotatably mounted in the frame 1 by means of driving means, f.i. by electric motor means 27, a pulley 28 and a belt or chain drive 29. The loosened fibre material falls on the endless belt 12 and is transported by said belt towards one of the pulleys 13 wherefrom the fibre material is removed through the pipe 14 by means of a suction arrangement 37 or the like. A pair of longitudinal extending deflector plates 15 are mounted on the frame 1 along both sides of the belt 12. The plates 15 direct the falling fibre material towards the center of the moving belt 12 and thereby prevent any spilling over of fibre material.

A regulating arrangement is provided to keep the fibre removing rate constant. The rollers 4 are rotatably on a frame 16, which in turn is vertically movably mounted on frame 17. The latter is supported on wheels 11 and is therefore in an unchanging spatial relationship with respect to the bottom bars 8 of hampers 7.

The frame 16 together with the rollers 4 is supported on the movable carriage 17 by means of coil springs 18 which rest on the movable carriage 17. The space between the path covered by the movable carriage 17 and the bottom grating 8 of the hamper 7 remains constant. The roller supporting frame 16 is pressed from below towards the bales 6 by means of the compression springs 18. Feeler members 19 are mounted on the frame 16 and project upwardly therefrom between the parallel bars 8 so that they bear against the bales 6. The feeler rollers 9 and thereby the pin rollers 16 are pressed down to a greater or lesser extent by the bales 6 depending on the weight and consistency of the latter. In this manner the penetration depth of the needles 5 of the teasing rollers 4 is regulated and remains substantially constant during the entire fibre removing operation. The supports 20 for the compression springs 18 can be adjusted by well known means in the vertical direction. The teasing rollers are advantageously driven by independent driving means that are arranged inside the carriage 2. For this purpose, an electric motor 21 can be arranged inside the movable carriage 17. The motor 21 is operatively connected by means of a belt or chain drive 23 to the driving pulleys 22 of the driving wheels 24 of the rollers 4. The direction of rotation of the motor 21 and consequently the rollers 4 can be expediently reversed when contact with one of the limit switches (not illustrated) is made due to the to and fro movement of the carriage 2. The movable carriage 17 has its own drive means with its own driving motor 30 mounted in the carriage 17. The aforementioned drive motor is operatively connected by driving means as a belt or chain drive 31 to gear or sprocket wheels 25, which engage a pair of oppositely mounted toothed rails 26 secured to the machine frame 1. As mentioned above, the direction of movement of the carriage 17 can be reversed by means of limit switches mounted on the frame 1 at opposite ends of the run of the carriage 17.

The needle penetration adjusting means are illustrated in FIGS. 4 and 5 and comprise a pair of arrangements being respectively mounted at opposite longitudinal ends of the carriage 17. Each arrangement of said pair includes a threaded spindle 32 connected with a ratchet wheel 33. A ratchet 34 is provided on a rod 35 the end of which protrudes by the spring 36 and will engage the frame 1. By the forward and rearward movement the carriage is automatically adjusted in the vertical direction by this arrangement.

While in accordance with the patent statutes only best known embodiments of our invention have been illustrated and described in detail, it is to be particularly understood that modifications and variations may be resorted to without departing from the spirit and scope of the invention, as those skilled in the art will readily understand. Such modifications and variations are considered to be within the purview and scope of the invention and appended claims.

We claim as new:

1. An apparatus for removing fibres from bales of fibre material, comprising in combination, a fixed frame adapted to support at least two bales of fibre material, a carriage reciprocally movably mounted in said fixed frame, fibre removing means operatively mounted on said carriage and adapted to engage the bottom layer of said bale of fibre material and thereby remove fibre therefrom, conveyor means operatively mounted in said fixed frame for transporting said removed fibres, fibre collection means mounted contiguously to said conveyor means for receiving and mixing said removed fibres, and first, second and third independent driving means respectively operatively connected to said carriage, fibre removing means and conveyor means for independently driving them; wherein the first driving means of said carriage comprises an electric motor mounted thereon, a gear wheel and cooperating rail operatively mounted to said electric motor, said rail being mounted on said fixed frame.

2. The apparatus as set forth in claim 1, including a plurality of fibre bale receiving means, which are supported on said fixed frame, each one of said plurality of fibre bale receiving means being adapted to hold at least one bale of compressed fibre material.

3. An apparatus for removing fibres from bales of compressed fibre material, comprising in combination, a fixed frame, a plurality of receiving hampers removably supported on said fixed frame, each one of said plurality of receiving hamper being adapted to hold at least one bale of compressed fibre material and having its bottom formed as a grating which is adapted to support at least one bale of fibre material, a carriage means reciprocally movably mounted in said fixed frame underneath said plurality of hampers, at least one roller rotatably mounted in said carriage means, said roller having a plurality of pins or needles projecting from its periphery, said pins or needles being adapted to be operatively moved so as to project into one of said plurality of hampers through said grating and thereby engage the bottom layer of a bale of compressed fibre material stored therein and remove a preselected quantity of fibres therefrom, conveyor belt means operatively mounted underneath said grating for collecting and transporting said removed fibres, and first, second and third independent driving means respectively operatively connected to said carriage means, roller and conveyor belt means.

4. The apparatus as set forth in claim 3, including collection means mounted at one end of said conveyor belt means for receiving said removed fibres.

5. The apparatus as set forth in claim 3, wherein each of said plurality of hampers comprise four side walls removably supported on said fixed frame and wherein said grating is composed of a plurality of parallel bars which extend prallel to the direction of movement of said carriage means.

6. The apparatus as set forth in claim 5, wherein said plurality of pins or needles are arranged into a plurality of rows on the periphery of said roller, each row being sufficiently spaced and arranged from the contiguous row so that one of said plurality of parallel bars can project therebetween.

7. An apparatus for removing fibres from bales of compressed fibre material, comprising in combination, a fixed frame, at least one receiving hamper removably supported on said fixed frame and adapted to hold at least one bale of compressed fibre material, said hamper having its bottom formed as a grating which is adapted to support said bale of fibre material, a first carriage reciprocably movably mounted in said fixed frame underneath said hamper, a second carriage supported by a plurality of biasing means mounted on said first carriage, at least one roller rotatably mounted in said second carriage, second electric motor driving means mounted on said first carriage and being operatively connected to said roller, said roller having a plurality of pins or needles projecting from its periphery, said pins or needles being adapted to be operatively moved so as to project into said hamper through said grating and thereby engage the bottom layer of said bale of compressed fibre material and remove a preselected quantity of fibres therefrom, conveyor belt means operatively mounted underneath said grating for collecting and transporting said removed fibres, and first and third independent driving means respectively operatively connected to said first carriage and conveyor belt means.

8. The apparatus as set forth in claim 7, wherein said biasing means comprise a plurality of compression springs, said second carriage further including at least one feeler member which is adapted to project through said grating and is thereby adapted to be engaged by a bale of fibre material stored in said hamper.

References Cited

UNITED STATES PATENTS

| 1,545,367 | 7/1925 | Tice | 19—81 |
| 2,938,239 | 5/1960 | Leineweber et al. | 19—80 |
| 3,204,298 | 9/1965 | Rapp | 19—145.5 |
| 3,208,107 | 9/1965 | Kotter et al. | 19—80 X |

FOREIGN PATENTS

| 544,405 | 6/1956 | Italy. |
| 299,281 | 7/1917 | Germany. |
| 581,334 | 8/1958 | Italy. |

DORSEY NEWTON, *Primary Examiner.*